United States Patent
Rihn et al.

(10) Patent No.: US 9,846,438 B2
(45) Date of Patent: *Dec. 19, 2017

(54) ELECTRONIC COMPENSATED PIVOT CONTROL

(71) Applicant: Microsoft Technology Licensing, LLC, Redmond, WA (US)

(72) Inventors: Bernard K. Rihn, Snohomish, WA (US); Avi R. Geiger, Seattle, WA (US); Andrew W. Hill, Redmond, WA (US); Joseph B. Gault, Seattle, WA (US); Stephen C. Klein, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 427 days.

This patent is subject to a terminal disclaimer.

(21) Appl. No.: 14/666,198

(22) Filed: Mar. 23, 2015

(65) Prior Publication Data

US 2015/0192929 A1     Jul. 9, 2015

Related U.S. Application Data

(63) Continuation of application No. 13/312,559, filed on Dec. 6, 2011, now Pat. No. 9,035,742.

(51) Int. Cl.
*G05D 3/00* (2006.01)
*G06F 1/16* (2006.01)
*G05B 15/02* (2006.01)

(52) U.S. Cl.
CPC ............. *G05D 3/00* (2013.01); *G05B 15/02* (2013.01); *G06F 1/1616* (2013.01);
(Continued)

(58) Field of Classification Search
CPC ........ G05D 3/00; G05B 15/02; G06F 1/1616; G06F 1/181; G06F 1/1601; F16M 11/06;
(Continued)

(56) References Cited

U.S. PATENT DOCUMENTS

| 4,447,033 A | 5/1984 | Jaumann et al. |
| 5,170,197 A | 12/1992 | Schmidt et al. |

(Continued)

FOREIGN PATENT DOCUMENTS

| CN | 1609840 | 4/2005 |
| CN | 1720008 | 1/2006 |

(Continued)

OTHER PUBLICATIONS

"Final Office Action", U.S. Appl. No. 13/312,559, dated Aug. 1, 2014, 14 pages.

(Continued)

*Primary Examiner* — An T Nguyen

(57) ABSTRACT

In embodiments of electronic compensated pivot control, a computing device includes a device housing that is integrated with a display device, and the device housing tilts for multiple display positions. Pivotable components pivot in coordination to position the display device in a display position, and sensors detect positioning inputs that are received to re-position the display device. Actuators are implemented for electronic actuation to drive the pivotable components to position the display device, and clutches are implemented to limit movement of the pivotable components. A pivot controller is implemented to receive input data corresponding to a user input to change a position of the display device, control the actuators based on the input data to assist with positioning the display device, receive an (Continued)

indication that the user input has stopped, and control the one or more clutches to hold the position of the display device.

20 Claims, 6 Drawing Sheets

(52) U.S. Cl.
CPC .......... *G06F 1/1679* (2013.01); *G06F 1/1681* (2013.01); *Y10S 248/917* (2013.01)

(58) Field of Classification Search
CPC ...... F16M 11/08; F16M 11/10; F16M 11/105; F16M 11/12; A47B 21/0314
See application file for complete search history.

(56) References Cited

U.S. PATENT DOCUMENTS

| | | | |
|---|---|---|---|
| 5,718,043 A | 2/1998 | Pearson | |
| 5,743,503 A | 4/1998 | Voeller et al. | |
| 5,771,152 A * | 6/1998 | Crompton | G06F 1/1601 |
| | | | 248/923 |
| 6,478,275 B1 | 11/2002 | Huang | |
| 6,675,070 B2 | 1/2004 | Lapham | |
| 6,974,362 B2 | 12/2005 | Lindell et al. | |
| 7,277,275 B2 | 10/2007 | Won et al. | |
| 7,344,481 B2 * | 3/2008 | Watterson | A63B 22/02 |
| | | | 482/4 |
| 7,395,967 B2 * | 7/2008 | Melville | G02B 6/262 |
| | | | 235/454 |
| 7,500,853 B2 | 3/2009 | Bevirt et al. | |
| 7,551,432 B1 | 6/2009 | Bockheim et al. | |
| 7,573,711 B2 | 8/2009 | Kim et al. | |
| 7,623,121 B2 | 11/2009 | Dodge | |
| 7,630,193 B2 | 12/2009 | Ledbetter et al. | |
| 7,685,885 B2 | 3/2010 | Cowgill | |
| 7,773,371 B2 | 8/2010 | Hillman et al. | |
| 7,834,857 B2 * | 11/2010 | Prados | B60K 35/00 |
| | | | 345/173 |
| 7,898,429 B2 | 3/2011 | Hwang et al. | |
| 7,903,100 B2 * | 3/2011 | Kondo | A63F 13/02 |
| | | | 248/917 |
| 8,180,485 B2 * | 5/2012 | Reckelhoff | A61G 12/001 |
| | | | 700/237 |
| 8,477,464 B2 * | 7/2013 | Visser | G06F 1/1613 |
| | | | 340/815.83 |
| 9,020,615 B2 | 4/2015 | Geiger | |
| 9,035,742 B2 | 5/2015 | Rihn et al. | |
| 2002/0088933 A1 | 7/2002 | Yu et al. | |
| 2005/0258323 A1 | 11/2005 | Lin | |
| 2006/0022108 A1 | 2/2006 | Kuga | |
| 2006/0044288 A1 | 3/2006 | Nakamura et al. | |
| 2006/0071135 A1 | 4/2006 | Trovato | |
| 2006/0256081 A1 | 11/2006 | Zalewski et al. | |
| 2007/0007413 A1 | 1/2007 | Jung et al. | |
| 2007/0058329 A1 | 3/2007 | Ledbetter et al. | |
| 2008/0158800 A1 * | 7/2008 | Aoyagi | G06F 1/1616 |
| | | | 361/679.01 |
| 2008/0158801 A1 | 7/2008 | Mathews | |
| 2008/0237424 A1 | 10/2008 | Clary | |
| 2009/0278008 A1 * | 11/2009 | Park | A47G 1/18 |
| | | | 248/231.91 |
| 2010/0061041 A1 * | 3/2010 | Chen | F16M 11/105 |
| | | | 361/679.01 |
| 2010/0084535 A1 * | 4/2010 | Cvek | A47B 21/007 |
| | | | 248/404 |
| 2012/0033371 A1 * | 2/2012 | Pankros | F16M 11/08 |
| | | | 361/679.21 |
| 2013/0141209 A1 | 6/2013 | Rihn | |
| 2013/0144446 A1 | 6/2013 | Rihn | |

FOREIGN PATENT DOCUMENTS

| | | |
|---|---|---|
| CN | 2881760 | 3/2007 |
| CN | 101098601 A | 1/2008 |
| CN | 101802772 | 8/2010 |
| CN | 102128337 | 7/2011 |
| CN | 102217289 | 10/2011 |
| TW | M281385 U | 11/2005 |

OTHER PUBLICATIONS

"International Search Report and Written Opinion", Application No. PCT/US2012/067809, dated Mar. 29, 2013, 10 pages.
"International Search Report and Written Opinion", Application No. PCT/US2012/067810, dated Mar. 29, 2013, 9 pages.
"Non-Final Office Action", U.S. Appl. No. 13/312,559, dated Feb. 13, 2014, 12 pages.
"Non-Final Office Action", U.S. Appl. No. 13/312,448, dated Sep. 12, 2014, 6 pages.
"Notice of Allowance", U.S. Appl. No. 13/312,448, dated Dec. 23, 2014, 4 pages.
"Notice of Allowance", U.S. Appl. No. 13/312,559, dated Dec. 19, 2014, 6 pages.
Tahmasebi,"Dynamic Parameter Identification and Analysis of a PHANToM Haptic Device", 2005 IEEE Conference on Control Applications Toronto, Aug. 28-31, 2005, available at <http://ieeexplore.ieee.org/stamp/stamp.jsp?tp=&arnumber=1507303&userType=inst>, Aug. 28, 2005, pp. 1251-1256.
Verner,"Force & Torque Feedback vs Force Only Feedback", Proceedings of SHIVETS '09, Mar. 18-20, 2009, available at <http://ieeexplore.ieee.org/stamp/stamp.jsp?tp=&arnumber=4810880>, Mar. 18, 2009, pp. 406-410.
Vischer,"Design and Development of High-Performance Torque-Controlled Joints", IEEE Transactions on Robotics and Automation, vol. 11, No. 4, Aug. 1995, available at <http://ieeexplore.ieee.org/stamp/stamp.jsp?arnumber=00406938>, Aug. 1995, pp. 537-544.
"Foreign Office Action", CN Application No. 201210518890.6, dated Nov. 4, 2015, 7 pages.
"Foreign Notice of Allowance", CN Application No. 201210518361.6, dated Mar. 30, 2016, 4 Pages.
"Foreign Notice of Allowance", CN Application No. 201210518890.6, dated Apr. 7, 2016, 4 pages.
"Office Action & Search Report Issued in Taiwan Patent Application No. 101141571", dated Aug. 4, 2016, 7 Pages.
"Office Action & Search Report Issued in Taiwan Patent Application No. 101141833", dated Jul. 11, 2016, 13 Pages.
"Foreign Office Action", CN Application No. 201210518890.6, dated Mar. 2, 2015, 13 pages.
"Foreign Office Action", CN Application No. 201210518361.6, dated Sep. 14, 2015, 18 Pages.
"Foreign Notice of Allowance", TW Application No. 105144090, Aug. 31, 2017, 6 pages.

* cited by examiner

ELECTRONIC COMPENSATED PIVOT CONTROL

RELATED APPLICATION

This application is a continuation of and claims priority to U.S. patent application Ser. No. 13/312,559 filed Dec. 6, 2011 entitled "Electronic Compensated Pivot Control" the disclosure of which is incorporated by reference herein in its entirety.

BACKGROUND

Various types of computing and media devices, such as desktop computers, portable computing devices, televisions, and other display devices, are increasingly designed with a touch-screen display for user input and touch interaction. The various types of devices, as well as an all-in-one computer (PC) with a movable display, can be designed for multi-position display, and used in an upright position as a vertical display, flat on a table as a horizontal display, or in an angled position between vertical and horizontal. For a device such as an all-in-one PC with a movable display, a number of display positions are undesirable for either usability, or balance and stability reasons. Further, for a multi-pivot link, the display positions depend on the rotation of multiple dependent axes, and locking out undesirable display positions requires coordination between the multiple dependent axes with complicated and costly mechanical linkages.

When a set of masses that are connected by two axes are moved, mechanical counter-balancing quickly becomes difficult or impossible unless one or both of the axes are positioned at the center of each connected mass, which makes the respective counter-balance force zero. The counter-balance force needed at each axis is dependent on the angle relative to the surface base for both masses. Further, because the two angles for the axes are unrelated, the spring resistance needs to be non-linearized, such as by a CAM or other device, and the forces need be correlated through some linkage between the two axes. Designing such a precise counter-balanced mechanical system is prohibitive in a small form factor and, if not designed well, can result in a poor user experience and feel when the display device is moved or tilted. Without precise counter-balancing, the apparent weight of the masses will change across the range of motion of the device. In most cases, a friction component is added to compensate for any mismatch in counter-balancing so that the device doesn't drift or fall over, which, once again, results in a poor user feel when the display device is adjusted to a display position.

SUMMARY

This Summary introduces simplified concepts of electronic compensated pivot control, and the concepts are further described below in the Detailed Description and/or shown in the Figures. This Summary should not be considered to describe essential features of the claimed subject matter, nor used to determine or limit the scope of the claimed subject matter.

Electronic compensated pivot control is described. In embodiments, a computing device includes a device housing that is integrated with a display device, and the device housing tilts for multiple display positions. Pivotable components pivot in coordination to position the device housing in a display position, and sensors detect positioning inputs that are received to re-position the device housing of the computing device. Actuators are implemented for electronic actuation to limit movement of the pivotable components, and alternatively, to drive the pivotable components to re-position the device housing. A pivot controller is implemented to control the actuators based on pressure sensor data and/or torque sensor data to position the device housing in a display position. The pivot controller coordinates one or more the pivotable components moving together to position the device housing of the computing device.

In other embodiments, the sensors include torque sensors that detect torque forces in device axes as the torque forces are imparted by a user to re-position the computing device. Alternatively or in addition, the sensors include pressure sensors that are integrated in device supports, and the pressure sensors detect pressure forces that are imparted by the user to re-position the computing device. The computing device includes a device base that is coupled to support the device housing. The device supports are integrated into the device base to support the computing device when placed on a surface, and the pressure sensors are integrated with the device supports.

In other embodiments, the pivot controller is implemented to control the pivotable components to counter-balance varying centers-of-mass of the computing device over a range of device positions to minimize a user input force that is applied to re-position the computing device. The pivot controller can electronically-control the counter-balance of the varying centers-of-mass of the computing device over the range of the device positions. The pivot controller can utilize a proportional-integral-derivative (PID) control feedback to counter-balance the varying centers-of-mass of the computing device to minimize the user input force that is applied to re-position the computing device.

BRIEF DESCRIPTION OF THE DRAWINGS

Embodiments of electronic compensated pivot control are described with reference to the following Figures. The same numbers may be used throughout to reference like features and components that are shown in the Figures.

DETAILED DESCRIPTION

Embodiments of electronic compensated pivot control are described. For a display device or an all-in-one PC with a movable display designed for multiple display positions, the multi-pivot positions depend on the rotation of multiple dependent axes and coordination between the axes. A pivot controller is implemented to electronically-control various pivotable components, actuators, motors, and clutch mechanisms based on position, pressure, force, torque, and/or rotation sensors that are integrated into a display device, or into an all-in-one computer device. The pivot controller is also implemented as an active stability system that reacts to external forces to maintain stability of the device. The system operates on force-feedback and can therefore accommodate a wider range of display positions than would otherwise be configurable with simple mechanical means.

While features and concepts of electronic compensated pivot control can be implemented in any number of different devices, systems, and/or configurations, embodiments of electronic compensated pivot control are described in the context of the following example devices, systems, and methods.

Figure 1:
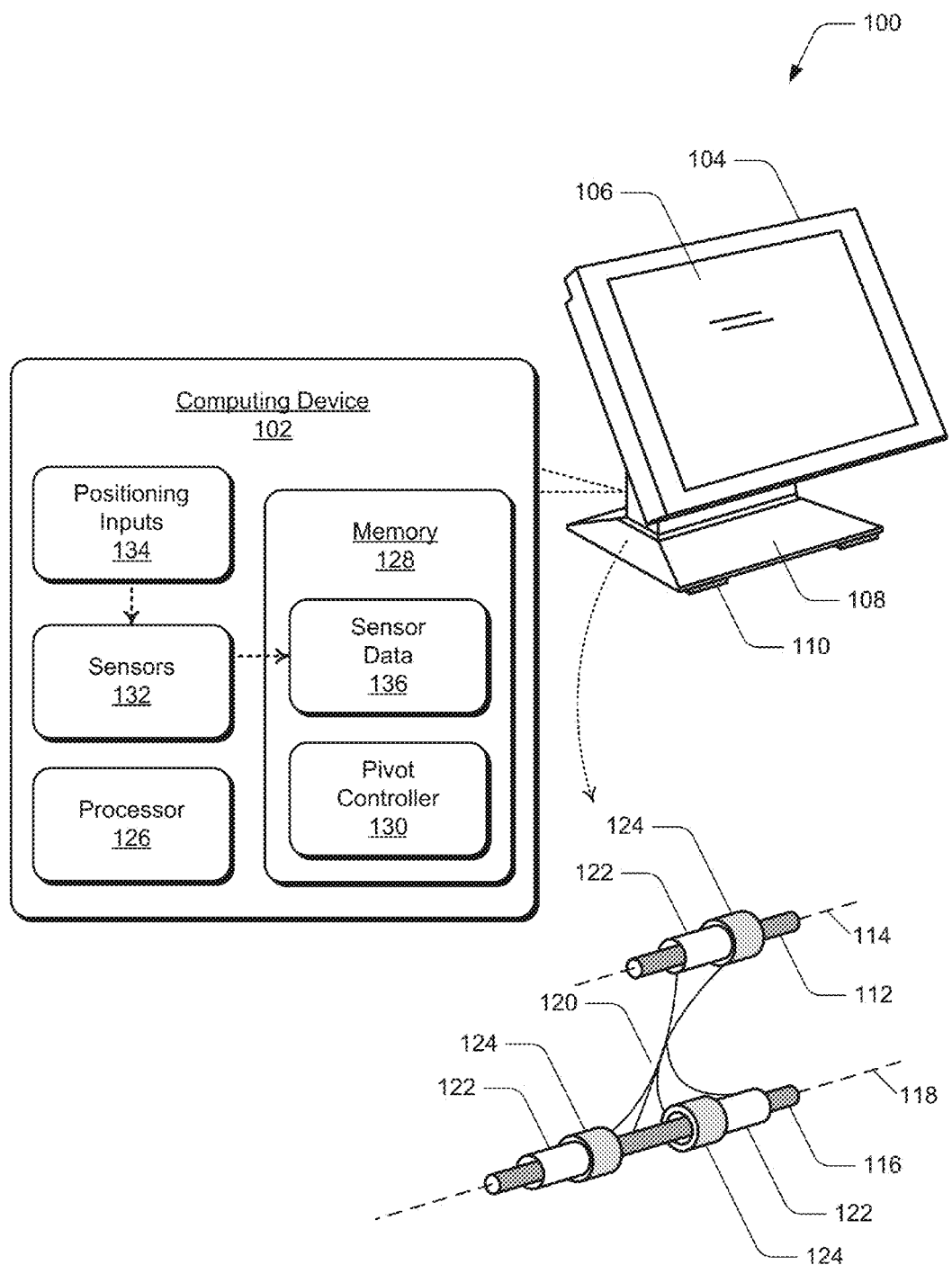
FIG. 1 illustrates an example electronic compensated pivot control system in accordance with one or more embodiments.

FIG. 1 illustrates an example electronic compensated pivot control system 100 in accordance with one or more embodiments. The example system 100 includes a computing device 102, such as an all-in-one computer (PC) with a device housing 104 that is integrated with a display device 106. The device housing can be raised, lowered, and/or tilted for multiple display positions of the display device. For example, the computing device can be used in an upright position as a vertical display, used flat on a table as a horizontal display, or in any angled position between vertical and horizontal. In this example, the computing device includes a device base 108 that is coupled to support the device housing. The computing device also includes device supports 110 (commonly referred to as "feet") that are integrated into the device base to support the computing device when placed on a surface.

In the electronic compensated pivot control system 100, the computing device 102 includes a pivotable component 112 that pivots on an axis 114, and includes another pivotable component 116 that pivots on an axis 118. The pivotable components are implemented to pivot in coordination to position the device housing 104 in one of multiple display positions. The pivotable components are electronically linked 120, and actuators 122 are implemented to drive the pivotable components to position the device housing. Optionally, clutch mechanisms 124 are implemented to engage and limit movement of the pivotable components, or release and allow movement of the pivotable components when driven by the actuators. In this example, a dual-pivot system is illustrated, although a device may include any number of pivotable components that pivot in coordination to position the device housing in a display position.

In this example, the pivotable components 112 and 116, the actuators 122, and the clutch mechanisms 124 are shown merely for illustration. In practice, the pivotable components, actuators, and clutch mechanisms can be implemented in any number of configurations with different components. In various implementations, the actuators may be implemented as any type of brushed or brushless motors, servo motors, or with electromagnetics. Additionally, the clutch mechanisms may be implemented as clutch barrels, rotary disc or drum brakes, particle clutches, electromagnetic brakes, interference and/or friction fit locks (e.g., one-way roller bearings), and/or as any other type of clutching mechanism. The clutch mechanisms may also be activated by actuators that are implemented to initiate the clutch mechanisms engaging and/or releasing the pivotable components.

In the electronic compensated pivot control system 100, the computing device 102 can be implemented with various components, such as a processor 126 (e.g., any of microprocessors, controllers, and the like) and memory 128 (e.g., a computer-readable storage media device) that enables data storage. The processor and memory of the computing device implement a pivot controller 130 as computer-executable instructions, such as a software application, that is executable to implement the various embodiments of electronic compensated pivot control as described herein.

The computing device 102 also includes various sensors 132 that detect positioning inputs 134, such as pressure sensor inputs and/or torque sensor inputs when a user re-positions (e.g., raises, lowers, or tilts) the device housing, and the sensors generate sensor data 136. In implementations, the sensors 132 can include any one or combination of capacitive, resistive, and inductive touch sensors, as well as mechanical buttons, rotary and linear pressure sensors, force sensors, force sensitive resistors, accelerometers, and/or rotary and linear potentiometers to detect user contact with the device. For example, the device supports 110 can be integrated with pressure sensors that are implemented to detect pressure inputs at the device supports when the computing device is positioned on a surface. The positioning inputs 134 can include any one or combination of a current position of the device housing, the sensed pressure on the device supports, and/or user force or torque inputs to raise, lower, or tilt the device housing when positioning the display device for use.

In embodiments, the pivot controller 130 is implemented to control the actuators 122 and/or the clutch mechanisms 124 based on the sensor data 136 to coordinate one or more of the pivotable components 112 and 116 moving together and position the device housing in a display position. For example, the pivot controller is implemented to control the actuators based on pressure sensor data and/or torque sensor data to position the device housing in a display position. The pivot controller is also implemented to determine user input to re-position (e.g., raise, lower, and/or tilt) the device housing based on the pressure sensor data and/or the torque sensor data, and controls the pivotable components moving to position the device. In embodiments, the pivot controller electronically-controls the pivotable components 112 and 116 to counter-balance varying centers-of-mass of the computing device over a range of device positions to minimize a user input force that is applied to re-position the device housing.

In implementations, the pivot controller 130 can utilize a proportional-integral-derivative (PID) control feedback to counter-balance the varying centers-of-mass of the computing device to minimize the user input force that is applied to re-position the computing device. The counter-balance provides that the user input force feels similarly weighted or weightless across the entire range of motion. By sensing the position of each component and calculating against known geometry, the electronic compensation can be implemented to adjust the counter-balance or friction to create the same effect across the entire range of device movement.

An active counter-balance can be implemented by various techniques. In an implementation, motors with PID control can be utilized, and the motor positions sensed through linear hall-effect sensors. The pivot controller 130 can sample the pressure data from the device supports 110 with the integrated pressure sensors to determine the dynamic force inputs, such as normalizing to the forces on the device supports with no force input from a user. Through the use of accelerometers in the three masses of the device (e.g., the base, support arm, and display device), the pivot controller can determine at any given point what the static pressures should be for a normalization factor. Depending on the dynamic force input measured through the pressure sensors, or through torque sensors in an alternate implementation, the pivot controller drives the pivotable components to a particular position using position, integral, derivative control.

The pivot controller 130 is also implemented to engage the clutch mechanisms 124 to limit or resist movement of the pivotable components 112 and 116 into an unstable or undesirable position of the device housing, and/or release the clutch mechanisms to allow movement of the pivotable components into a stable or desirable position of the device housing. The pivot controller can also determine an unstable position of the device housing and initiate activation of the actuators 122 to re-position the device housing to a stable position. For example, rotary potentiometers or accelerometers can be implemented to provide the positioning inputs and sensor data to the pivot controller.

In addition, the pivot controller 130 is implemented to determine movement towards an unstable position of the device housing 104 based on the sensor data 136 that corresponds to the positioning inputs 134, and engage the clutch mechanisms 124 to limit movement of the pivotable components 112 and 116 into the unstable position. The pivot controller 130 can determine user input, such as force or torque inputs and/or detect pressure as input, to tilt or re-position the device housing based on the sensor data and control the actuators and clutch mechanisms to resist the user input. The pivot controller can also be implemented to control the actuators and/or clutch mechanisms to counter-balance the system centers-of-mass so that user input force feels uniform to the user over the range of the non-linear forces as the device housing is moved. The apparent force that the user applies to move the device is then approximately constant and close to zero (e.g., so that the device seems to float, such as like having a force follower).

Figure 2:
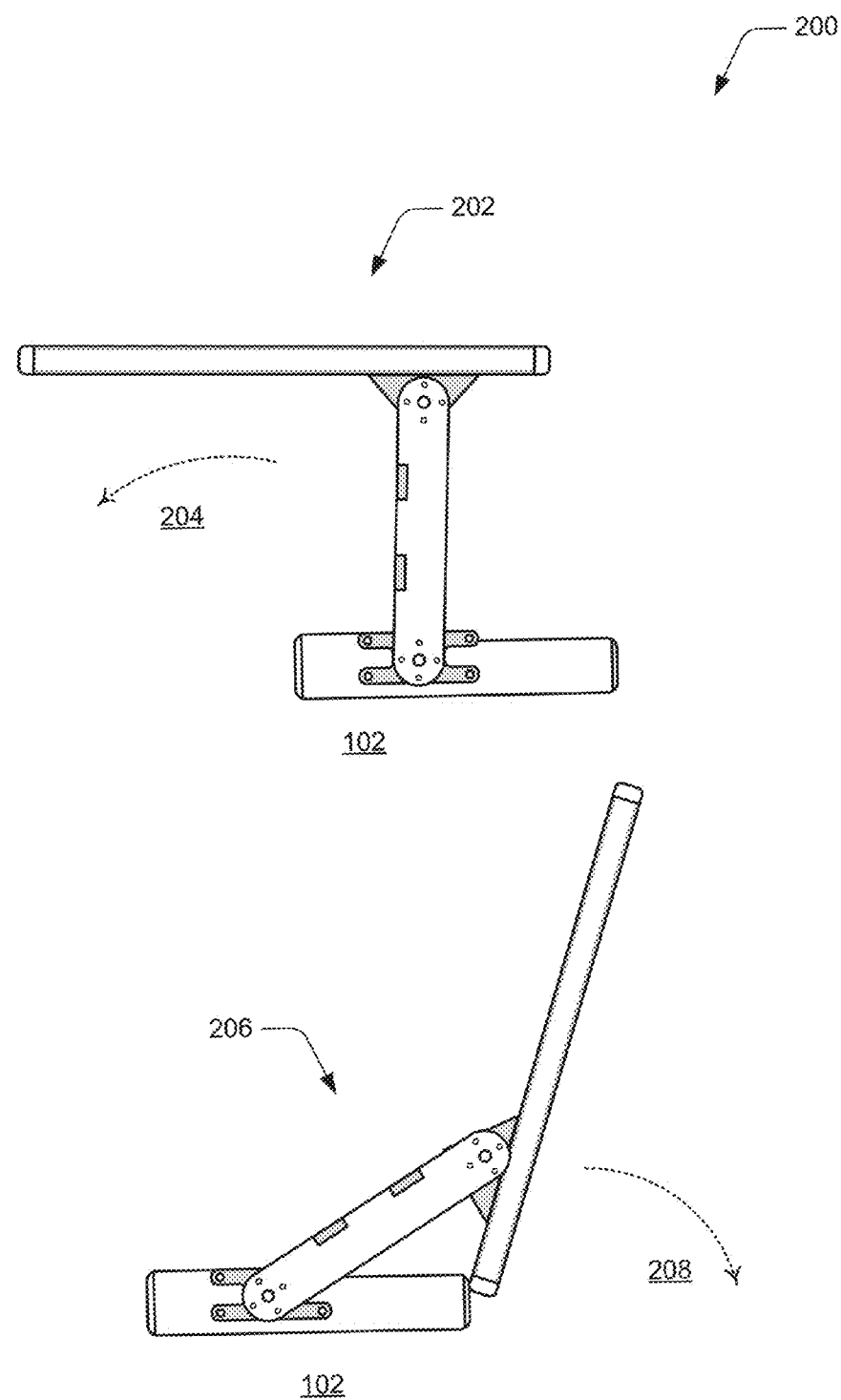
FIG. 2 illustrates examples of unstable or undesirable display positions of a display device, or a computing device that includes an integrated display device.

FIG. 2 illustrates examples 200 of unstable or undesirable display positions of a display device, or a computing device, such as the all-in-one computing device 102 described with reference to FIG. 1. In these examples, the computing device is shown in an unstable rearward leaning position 202 that may have a tendency to tip over backward as shown at 204. The computing device is also shown in an unstable forward leaning position 206 that may have a tendency to tip over forward as shown at 208, which levers the display against the base and damages the device. In these unstable display positions, the pivot controller 130 can initiate the actuators 122 to drive the pivotable components 112 and 116 to re-position the device housing to a stable position.

Alternatively or in addition, the pivot controller 130 can determine movement towards one of the unstable positions of the device and engage the clutch mechanisms 124 to limit movement of the pivotable components 112 and 116 into the unstable position of the display device. For example, if the display device 106 (e.g., integrated into the device housing 104 of the computing device 102) is tilted to a rearward limit by user input, the clutch mechanisms that allow forward tilt can be released, while the clutch mechanisms that allow rearward tilt would be engaged to prevent the display device being positioned in the unstable rearward leaning position 202. Similarly, if the display device is tilted too far forward (so as to lever the display against the base), the clutch mechanisms that allow rearward tilt or movement can be released, while the clutch mechanisms that allow forward tilt would remain engaged to prevent further forward movement into the unstable forward leaning position 206.

Figure 3:
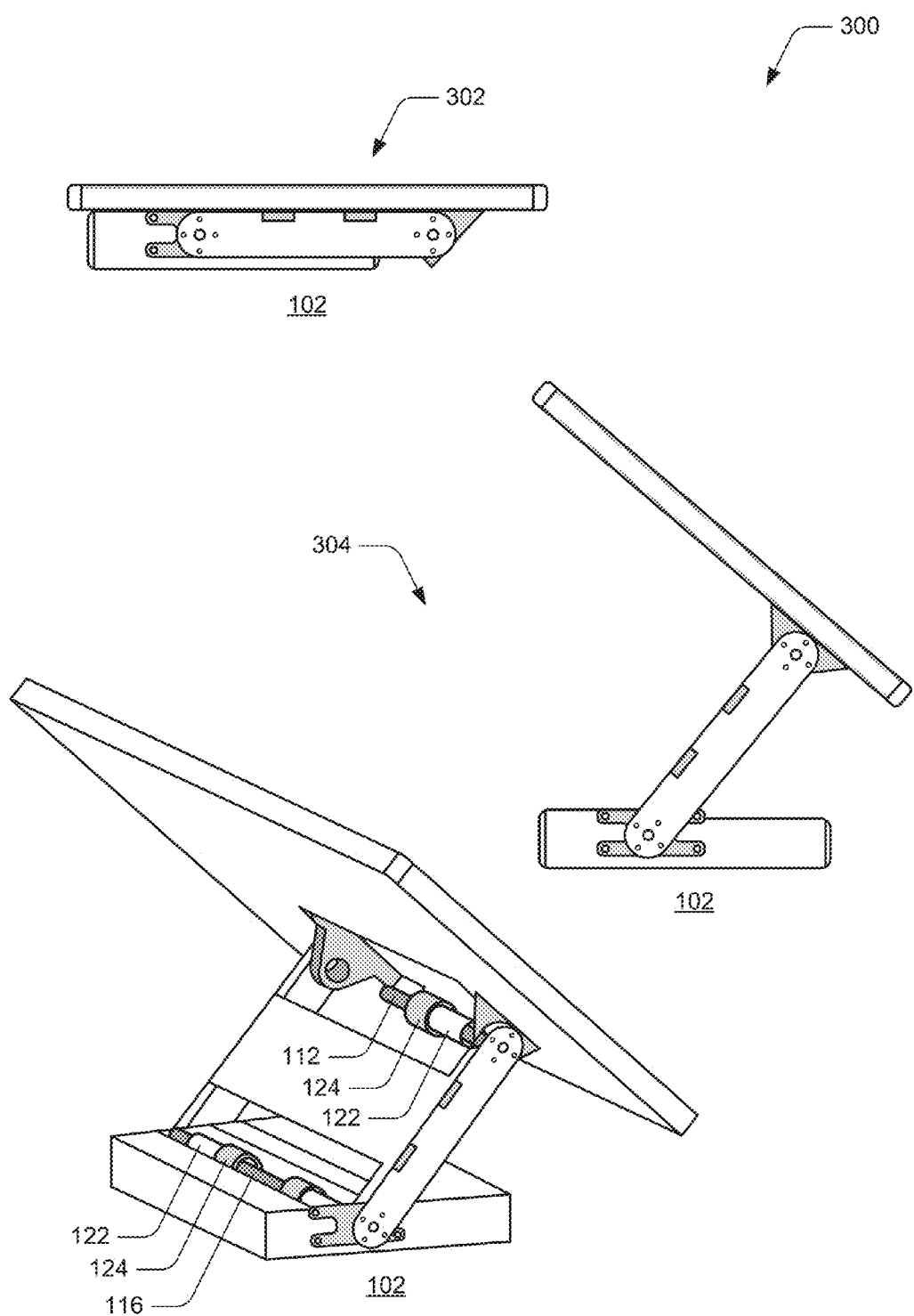
FIG. 3 illustrates examples of stable display positions of a display device, or a computing device that includes an integrated display device.

FIG. 3 illustrates examples 300 of stable display positions of a display device, or a computing device, such as the all-in-one computing device 102 described with reference to FIG. 1. In these examples, the computing device is shown in a stable horizontal position 302, and is shown in a stable display position 304. Additionally, examples of the various pivotable components 112 and 116, the actuators 122, and the clutch mechanisms 124 are shown installed in the computing device in the stable display position 304.

Example methods 400 and 500 are described with reference to respective FIGS. 4 and 5 in accordance with one or more embodiments of electronic compensated pivot control. Generally, any of the services, functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable storage media devices, both local and/or remote to a computer processor. Further, the features described herein are platform-independent and can be implemented on a variety of computing platforms having a variety of processors.

Figure 4:
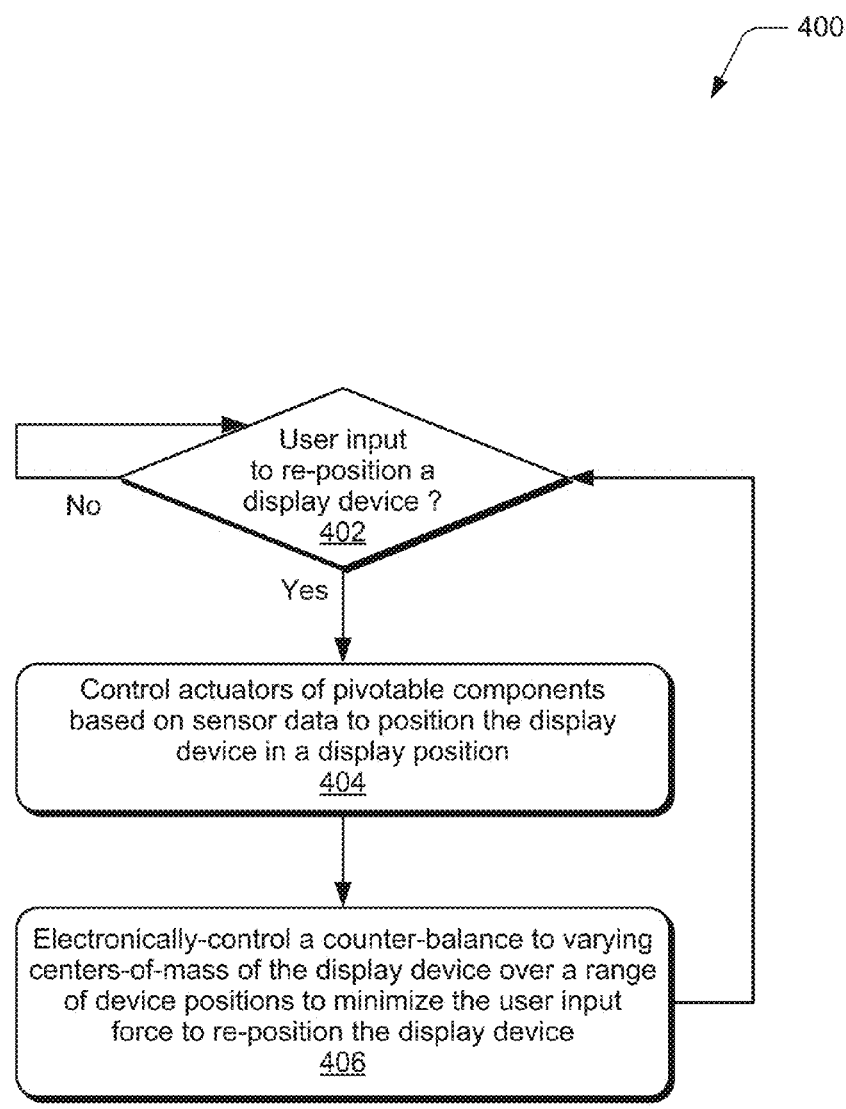
FIG. 4 illustrates example method(s) of electronic compensated pivot control in accordance with one or more embodiments.

FIG. 4 illustrates example method(s) 400 of electronic compensated pivot control. The order in which the method blocks are described are not intended to be construed as a limitation, and any number of the described method blocks can be combined in any order to implement a method, or an alternate method.

At block 402, a determination is made as to whether a user input is received to re-position a display device. For example, the sensors 132 (FIG. 1) detect positioning inputs as pressure and/or torque inputs when received to re-position (e.g., raise, lower, or tilt) the display device 106 (e.g., integrated into the device housing 104 of the computing device 102) to one of multiple display positions. The pivot controller 130 determines that the positioning inputs correspond to a user input to re-position the display device based on pressure sensor data and/or torque sensor data.

If a user input is received to re-position the display device (i.e., yes from block 402), then at block 404, actuators of the pivotable components are controlled based on sensor data to position the display device in a display position. For example, the pivot controller 130 electronically-actuates the actuators 122 to coordinate one or more of the pivotable components 112 and 116 moving together to position the display device. If no user input is detected (i.e., no from block 402), then the method continues at block 402 to monitor and/or detect a user input to re-position the display device.

At block 406, a counter-balance to varying centers-of-mass of the display device over a range of device positions is electronically-controlled to minimize a user input force to re-position the display device. For example, the pivot controller 130 electronically-controls the actuators 122 moving the pivotal components 112 and 116 to counter-balance the varying centers-of-mass of the display device over a range of the device positions to minimize the user input force and assist raising, lowering, and/or tilting the display device. In implementations, the pivot controller can utilize a proportional-integral-derivative (PID) control feedback to determine the counter-balance.

Figure 5:
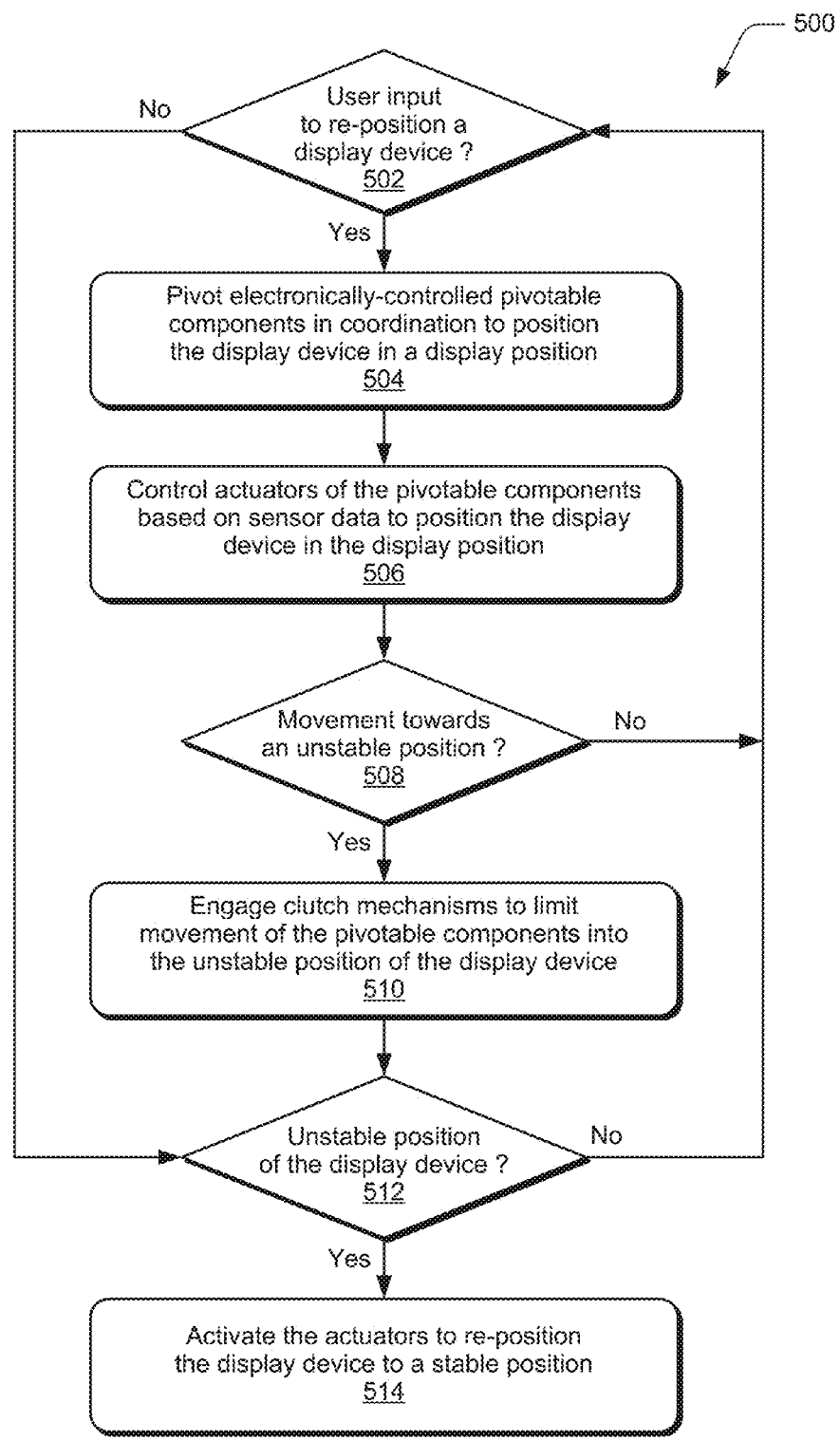
FIG. 5 illustrates example method(s) of electronic compensated pivot control in accordance with one or more embodiments.

FIG. 5 illustrates example method(s) 500 of electronic compensated pivot control. The order in which the method blocks are described are not intended to be construed as a limitation, and any number of the described method blocks can be combined in any order to implement a method, or an alternate method.

At block 502, a determination is made as to whether a user input is received to re-position a display device. For example, the sensors 132 (FIG. 1) detect positioning inputs when received to re-position (e.g., raise, lower, or tilt) the display device 106 (e.g., integrated into the device housing 104 of the computing device 102) to one of multiple display positions, and the pivot controller 130 determines that the positioning inputs correspond to a user input to re-position the display device.

If user input is received to tilt the display device (i.e., yes from block 502), then at block 504, electronically-controlled pivotable components are pivoted in coordination to position the display device in the display position. For example, the pivot controller 130 initiates the actuators 122 to drive the pivotable components 112 and 116 that are electronically coordinated to move together to position the display device. Alternatively or in addition, the pivot controller engages and/or releases the clutch mechanisms 124 to limit and/or allow movement of the pivotable components. If no user input is detected (i.e., no from block 502), then the method continues at block 512 as described below to determine whether the display device is in an unstable position.

At block 506, a uniform electrically-compensated input resistance is applied to counter-balance the user input. For example, the pivot controller 130 controls the actuators 122 and/or the clutch mechanisms 124 to uniformly apply an electrically-compensated input resistance, or electrically-controlled friction, to counter-balance the user input.

At block 508, a determination is made as to whether the user input causes movement towards an unstable position of the display device. For example, the pivot controller 130 determines from the sensor data 136 that is based on the detected positioning inputs 134 (e.g., pressure and/or torque inputs) whether the user input will position the display device in an unstable position. If the user input is movement towards an unstable position (i.e., yes from block 508), then at block 510, the clutch mechanisms are engaged to limit movement of the pivotable components into the unstable position of the display device. For example, the pivot controller 130 initiates engaging the clutch mechanisms to limit movement of the pivotable components 112 and 116 to the unstable position of the display device. If the user input is not moving towards an unstable position (i.e., no from block 508), then the method continues at block 502 to monitor for and/or detect a user input to re-position the display device.

At block 512, a determination is made as to whether the display device is in an unstable position based on the sensor data. For example, the pivot controller 130 detects whether the display device has been positioned in an unstable position. If the pivot controller does detect that the display device is positioned in an unstable position (i.e., yes from block 512), then at block 514, the actuators are activated to re-position the display device to a stable position. For example, the pivot controller 130 activates the actuators 122 and/or releases the clutch mechanisms 124 to re-position the display device to a stable position. If the pivot controller does not detect that the display device is positioned in an unstable position (i.e., no from block 512), then the method continues at block 502 to monitor for and/or detect a user input to re-position the display device.

Figure 6:
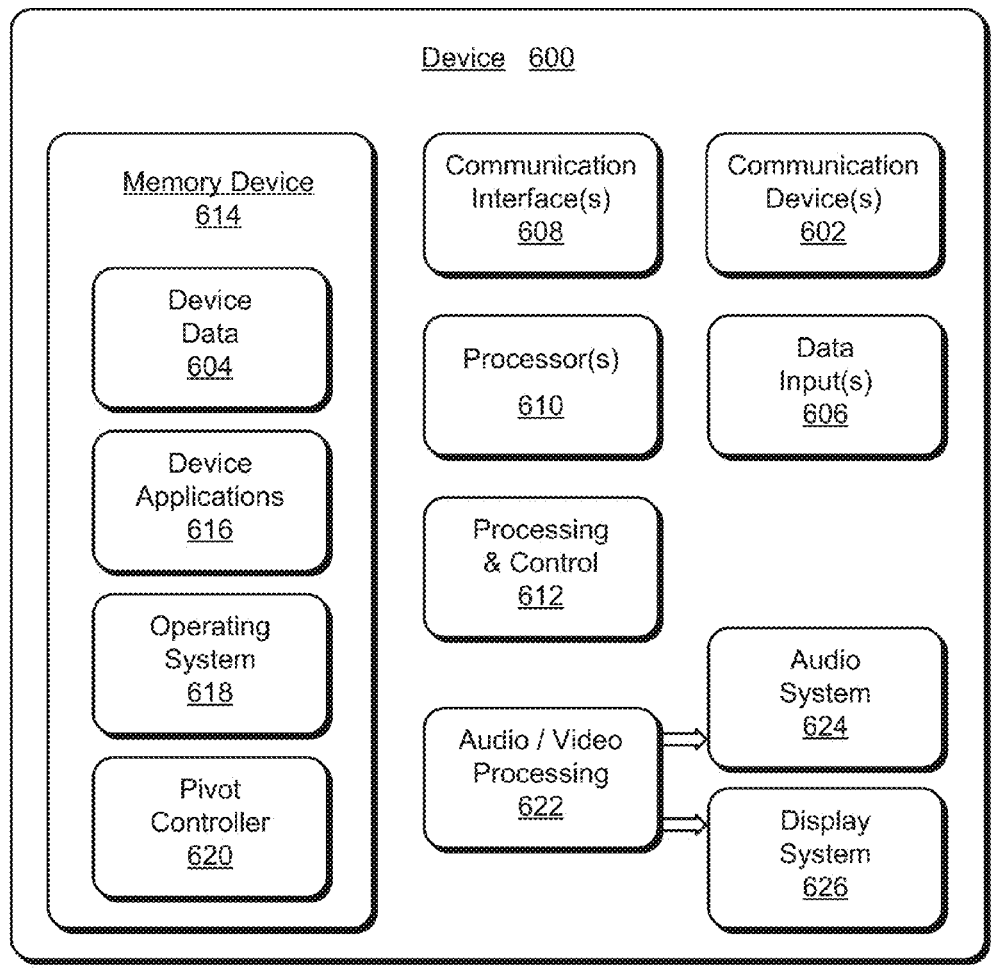
FIG. 6 illustrates various components of an example device in which embodiments of electronic compensated pivot control can be implemented.

FIG. 6 illustrates various components of an example device 600 that can be implemented as any of the devices, or services implemented by devices, described with reference to the previous FIGS. 1-5. In embodiments, the device may be implemented as any one or combination of a computing device, all-in-one computer, consumer, user, television, appliance, gaming, media playback, and/or electronic device. The device may also be associated with a user (i.e., a person) and/or an entity that operates the device such that a device describes logical devices that include users, software, firmware, hardware, and/or a combination of devices.

The device 600 includes communication devices 602 that enable wired and/or wireless communication of device data 604, such as received data, data that is being received, data scheduled for broadcast, data packets of the data, etc. The device data or other device content can include configuration settings of the device, media content stored on the device, and/or information associated with a user of the device. Media content stored on the device can include any type of audio, video, and/or image data. The device includes one or more data inputs 606 via which any type of data, media content, and/or inputs can be received, such as user-selectable inputs and any other type of audio, video, and/or image data received from any content and/or data source.

The device 600 also includes communication interfaces 608, such as any one or more of a serial, parallel, network, or wireless interface. The communication interfaces provide a connection and/or communication links between the device and a communication network by which other electronic, computing, and communication devices communicate data with the device. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 600 includes one or more processors 610 (e.g., any of microprocessors, controllers, and the like) which process various computer-executable instructions to control the operation of the device. Alternatively or in addition, the device can be implemented with any one or combination of software, hardware, firmware, or fixed logic circuitry that is implemented in connection with processing and control circuits which are generally identified at 612. The device 600 also includes one or more memory devices 614 (e.g., computer-readable storage media devices) that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like. The device may also include a mass storage media device.

Computer readable media can be any available medium or media that is accessed by a computing device. By way of example, and not limitation, computer readable media may comprise storage media and communication media. Storage media include volatile and non-volatile, removable and non-removable media implemented in any method or technology for storage of information, such as computer-readable instructions, data structures, program modules, or other data. Storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store data and which can be accessed by a computer.

Communication media typically embody computer-readable instructions, data structures, program modules, or other data in a modulated data signal, such as carrier wave or other transport mechanism. Communication media also include any information delivery media. A modulated data signal has one or more of its characteristics set or changed in such a manner as to encode information in the signal. By way of example, and not limitation, communication media include wired media such as a wired network or direct-wired connection, and wireless media such as acoustic, RF, infrared, and other wireless media.

A memory device 614 provides data storage mechanisms to store the device data 604, other types of information and/or data, and various device applications 616. For example, an operating system 618 can be maintained as a software application with the memory device and executed on the processors. The device applications may also include a device manager, such as any form of a control application, software application, signal processing and control module, code that is native to a particular device, a hardware abstraction layer for a particular device, and so on. In this example, the device applications 616 include a pivot controller 620 that implements embodiments of electronic compensated pivot control as described herein.

The device 600 also includes an audio and/or video processing system 622 that generates audio data for an audio system 624 and/or generates display data for a display system 626. The audio system and/or the display system may include any devices that process, display, and/or otherwise render audio, video, display, and/or image data. Display data and audio signals can be communicated to an audio device and/or to a display device via an RF (radio frequency) link, S-video link, composite video link, component video link, DVI (digital video interface), analog audio connection, or other similar communication link. In implementations, the audio system and/or the display system are external components to the device. Alternatively, the audio system and/or the display system are integrated components of the example device.

Although embodiments of electronic compensated pivot control have been described in language specific to features and/or methods, the subject of the appended claims is not necessarily limited to the specific features or methods described. Rather, the specific features and methods are disclosed as example implementations of electronic compensated pivot control.

The invention claimed is:

1. A pivotable system for a display device comprising:
   pivotable components at multiple pivot points configured to pivot in coordination to position the display device in one of multiple display positions;
   one or more actuators configured to drive the pivotable components to position the display device;
   one or more clutches configured to limit movement of the pivotable components;
   a pivot controller configured to:
   receive input data corresponding to a user input to change a position of the display device;
   control the one or more actuators based on the input data to assist with positioning the display device;
   determine based on the input data, movement towards an unstable position of the display device; and
   control the one or more clutches to limit movement of the pivotable components into the unstable position and hold the position of the display device.

2. The pivotable system as recited in claim 1, wherein the input data corresponds to a minimal apparent force applied as the user input to effectuate the one or more actuators driving the pivotable components to position the display device, the input data received from one or more sensors integrated into a display housing associated with the display device.

3. The pivotable system as recited in claim 1, wherein the one or more clutches utilize one or more mechanical mechanisms to limit movement of the pivotable components.

4. The pivotable system as recited in claim 1, wherein the one or more clutches utilize electronic activation of the one or more actuators to engage or release the pivotable components.

5. The pivotable system as recited in claim 1, wherein the pivot controller is configured to receive an indication that the user input has stopped.

6. The pivotable system as recited in claim 1, wherein the pivot controller is configured to: determine that the display device is in the unstable position; and initiate the one or more actuators to re-position the display device in a stable position.

7. The pivotable system as recited in claim 1, wherein the pivot controller is configured to control the one or more actuators to counter-balance varying centers-of-mass of the display device over a range of the multiple display positions to minimize an apparent force of the user input that is applied to re-position the display device.

8. The pivotable system as recited in claim 7, wherein the pivot controller is further configured to electronically-control the counter-balance of the varying centers-of-mass of the display device over the range of the multiple display positions.

9. The pivotable system as recited in claim 7, wherein the pivot controller is further configured to utilize a proportional-integral-derivative (PID) control feedback to said counter-balance the varying centers-of-mass of the display device to minimize the apparent force of the user input that is applied to re-position the display device.

10. A method to control the stability of a display device, the method comprising:
    receiving input data corresponding to a user input to change a position of the display device;
    controlling one or more actuators based on the input data to drive pivotable components at multiple pivot points to assist with positioning the display device;
    determining movement towards an unstable position of the display device; and
    controlling one or more clutches to limit movement of the pivotable components into the unstable position and hold the position of the display device.

11. The method as recited in claim 10, further comprising:
    receiving an indication that the user input has stopped; and
    engaging the one or more clutches to hold the position of the display device.

12. The method as recited in claim 10, further comprising:
    determining that the display device is in the unstable position; and
    initiating the one or more actuators to re-position the display device in a stable position.

13. The method as recited in claim 10, wherein the input data corresponds to a minimal apparent force applied as the user input to effectuate the one or more actuators driving the pivotable components to position the display device.

14. The method as recited in claim 10, wherein the input data is received by at least one of:
    pressure sensors integrated with device supports configured to support a device housing of the display device;

torque sensors that detect torque forces in device axes corresponding to the multiple pivot points, the torque forces imparted as the user input; and positional sensors that detect the position of the device housing of the display device.

15. The method as recited in claim 10, wherein said controlling the one or more actuators comprises driving the one or more actuators to counter-balance varying centers-of-mass of the display device over a range of device positions to minimize an apparent force of the user input that is applied to re-position the display device.

16. The method as recited in claim 15, further comprising electronically-controlling the counter-balance of the varying centers-of-mass of the display device over the range of the device positions.

17. The method as recited in claim 15, further comprising utilizing a proportional-integral-derivative (PID) control feedback to counter-balance the varying centers-of-mass of the display device to minimize the apparent force of the user input that is applied to re-position the display device.

18. A stability system for a display device, comprising:
one or more sensors configured to generate sensor data associated with positioning the display device;
pivotable components configured to pivot in coordination to position the display device in one of multiple display positions;
a pivot controller configured to:
receive the sensor data from the one or more sensors, the sensor data corresponding to input forces imparted to change a position of the display device;
determine, based on the sensor data, movement towards an unstable position of the display device; and
control one or more clutch mechanisms of the pivotable components to limit movement of the stability system for the display device into the unstable position.

19. The stability system as recited in claim 18, wherein the pivot controller is configured to initiate the one or more clutch mechanisms to limit the movement of the stability system into the unstable position of the display device.

20. The stability system as recited in claim 18, wherein the pivot controller is configured to: determine, based on the sensor data, that the display device is in the unstable position; and initiate one or more actuators to re-position the display device in a stable position.

* * * * *